United States Patent [19]

Bossler, III et al.

[11] 3,988,427
[45] Oct. 26, 1976

[54] FLAME REACTION PROCESS FOR PRODUCING HYDROGEN BROMIDE

[75] Inventors: Joseph A. Bossler, III, Greenwell Springs, La.; Robert J. Fanning, Baton Rouge, La.

[73] Assignee: Ethyl Corporation, Richmond, Va.

[22] Filed: Mar. 7, 1975

[21] Appl. No.: 556,493

Related U.S. Application Data

[63] Continuation-in-part of Ser. No. 472,444, May 22, 1974, abandoned.

[52] U.S. Cl. ............................. 423/487; 423/659; 423/277
[51] Int. Cl.² ......................................... C01B 7/12
[58] Field of Search ............ 423/487, 486, 613, 659

[56] References Cited
UNITED STATES PATENTS

| | | | |
|---|---|---|---|
| 2,295,591 | 9/1942 | Maude | 423/487 |
| 2,330,440 | 9/1943 | Maude | 423/487 |
| 2,366,669 | 1/1945 | Maude | 423/487 X |

*Primary Examiner*—Edward Stern
*Attorney, Agent, or Firm*—Donald L. Johnson; John F. Sieberth; Shelton B. McAnelly

[57] ABSTRACT

A flame reactor burner is provided for reacting hydrogen and bromine to produce hydrogen bromide. Flame stability is enhanced by producing a helical flow of well mixed reactants within the burner, whereby the reactants in intimate contact with each other are propelled in an outward spiral path as they exit from the burner producing a hemispherical flame of high stability.

2 Claims, 9 Drawing Figures

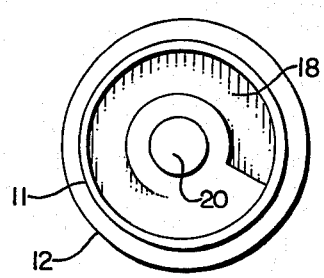
FIG. 4.
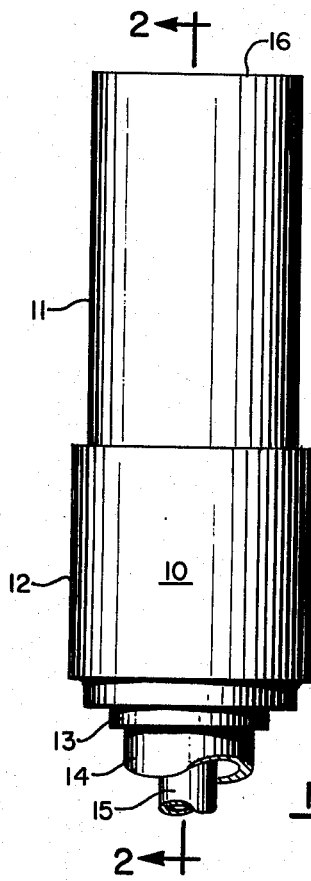
FIG. 1.
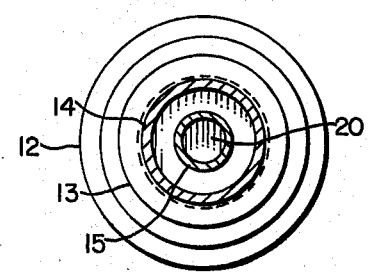
FIG. 3.
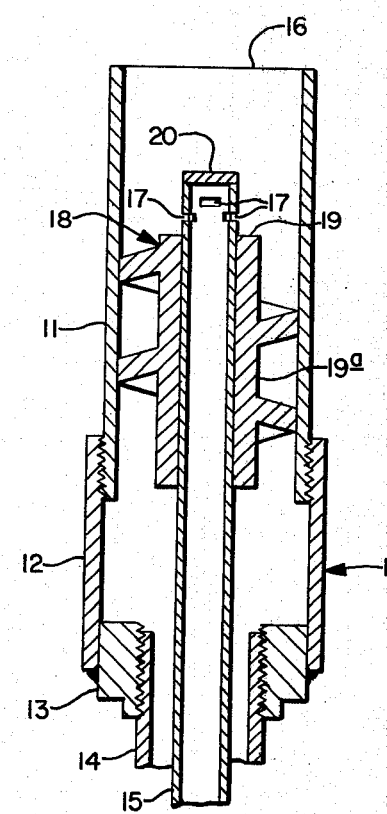
FIG. 2.
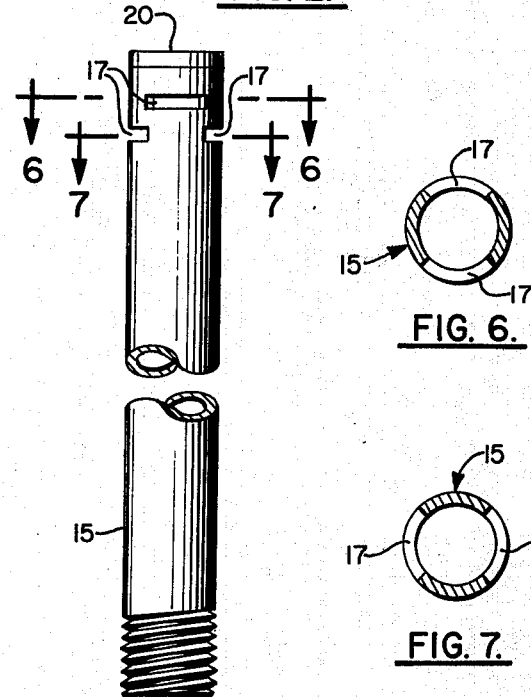
FIG. 5.
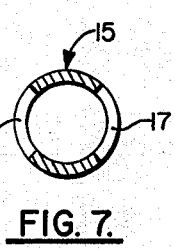
FIG. 6.
FIG. 7.

FLAME REACTION PROCESS FOR PRODUCING HYDROGEN BROMIDE

CROSS REFERENCE TO RELATED APPLICATION

This application is a continuation-in-part of Ser. No. 472,444, filed May 22, 1974, now abandoned.

BACKGROUND OF THE INVENTION

1. Field of the Invention

This invention relates to a flame reactor, particularly to a burner for use therein, more particularly to a reactor for combining bromine and hydrogen to produce hydrogen bromide.

2. Description of the Prior Art

Although flame reactors have been used in the prior art for the production of hydrogen bromide from bromine and hydrogen, it is well known that flame reactors are difficult to control and are prone to serious instability when reacting bromine and hydrogen. The problem of flame stability is particularly acute with prior art systems using the desired stoichiometric proportions (about 1:1 mol ratio) of hydrogen and bromine to minimize the amount of unreacted reactants present in the HBr product. With prior art flame reactors, the use of feed mixtures containing more than 45 (mol) percent bromine is characterized by cone-shaped flames which are difficult to ignite, which flicker markedly and which easily lift off the burner which latter condition is usually undesirable with prior art burners. Such flames usually have elongated cones frequently with holes in the center or at the edges through which the reactants escape without burning.

The stability problem with prior art flame reactors when reacting hydrogen and bromine is much more severe than when reacting chlorine and hydrogen to produce hydrogen chloride. The chlorine-hydrogen flame reaction is usually stable even with simple coaxial tubular burner designs. Although such simple flame reactor burners can be used for prolonged periods with chlorine, they are not suitable for the reaction of hydrogen and bromine to produce hydrogen bromide. Usually if such burners can be adjusted to provide a reasonably stable flame with bromine they have a very short useful life.

BRIEF SUMMARY OF THE INVENTION

In accordance with the present invention, a novel flame reactor burner is provided which is suitable for the flame reaction of bromine and hydrogen to produce hydrogen bromide. This burner permits stable operation over long periods even when feeding substantially stoichiometric proportions (1:1 molar) of hydrogen and bromine. Flame reactor burners constructed and utilized in accordance with the teachings of the present invention do not require extended tips or flame arresters and are characterized by long life with substantially no maintenance and by stable flames which can be controlled over a wide range of burning rates without developing instability. The burners of the present invention preferably operate without any visible contact of the flame and the burner tip; in other words, with complete lift-off or blow-off of the flame from the burner tip. Despite this, the flames are stable and provide substantially complete combustion even at reactant mol ratios of approximately 1:1. It appears that the absence of flame contact with the burner contributes materially toward avoiding excessive heating of the burner and hence prolongs its life.

More particularly, this invention provides an improved process for reacting bromine and hydrogen to produce hydrogen bromide. The improved process of this invention comprises establishing a helical flow of bromine in a cylindrical enclosure, feeding hydrogen radially outward into the bromine in the region of its helical flow and continuously feeding the resultant helico-spiraling flow of bromine and hydrogen into a flame maintained in the vicinity of the discharge end of said enclosure. Preferably the hydrogen is fed into the bromine in the cylindrical enclosure downstream from the location at which the helical flow of bromine is established.

An important aspect of the present invention is the creation in the burner of a helical flow of at least one reactant as well as a well mixed combustible mixture of bromine and hydrogen. An important feature of such a helical flow is that as the helically flowing reactant mixture leaves the burner, at the discharge end thereof, centrifugal forces due to the spinning motion cause the heavy bromine to spiral outward producing a desired hemispherical flame even when using a substantially 1:1 mol ratio of bromine and hydrogen. The result is rapid and complete flame reaction in a stable flame over a wide range of feed rates covering a range of 10:1 or larger. It is characteristic of the present burner which uses the helical flow pattern that there is no need to use an extended length tip to preheat the reactants or to use flame arresters such as gauze or a perforated plate placed across the flow path in the burner to prevent flash-back of the flame into the interior of the burner.

The overall helico-spiral flow of one reactant coupled with the radial injection of the other reactant outwardly into it within the burner minimizes or substantially avoids axial flow of both reactants after they leave the burner. As a consequence, long conical high velocity flames are avoided and a more distributed "hemispherical" or "mushroom" low velocity flame of excellent stability results over a wide range of flow rates of the reactants. It is desired that the helical, radial and spiral flows mentioned herein be vigorous so as to provide good mixing and, especially, a decided spiral flow component to the bulk of the reactants as they leave the discharge end or mouth of the burner.

The present invention provides an improved flame reactor burner for reacting bromine and hydrogen which comprises, a cylindrical enclosure, means cooperative with said cylindrical enclosure for establishing a helical flow of a first gaseous reactant in the cylindrical enclosure, and means positioned along the axis of flow of said gaseous reactant to feed a second gaseous reactant radially outward into the first gaseous reactant in the region of helical flow of the first gaseous reactant.

Preferably, the first gaseous reactant is bromine and the second gaseous reactant is hydrogen. Preferably, the second gaseous reactant is fed into the first gaseous reactant downstream from the means for establishing a helical flow of the first gaseous reactant. Preferably, the means for establishing a helical flow of a first gaseous reactant is a stationary helix disposed within the cylindrical enclosure. A preferred arrangement for the helix is one wherein the reactant flow path for the helical flow reactant is restricted to the outer half of the inside radius of the cylindrical enclosure. With this arrangement, the helical flow reactant is blocked from flowing in a more or less straight path along the longitudinal axis of the cylindrical enclosure. With the radial flow provided for the second reactant into the first reactant in the region of helical flow of the first gaseous reactant, the second reactant is also caused to avoid straight path flow along the longitudinal axis of the cylindrical enclosure after it is brought into contact with the first reactant. Preferably the periphery of the helix is in contact with or forms a part of the cylindrical enclosure. To establish and maintain desired vigorous helical, radial and spiral flows of reactants as described herein, it is preferred that the pressure drop across the burner for both reactants be at least equal to the ambient or static pressure into which the burner discharges.

BRIEF DESCRIPTION OF THE DRAWING

Fig. 1 shows an elevation view of a flame reactor burner embodying the features of the present invention.

FIG. 2 shows a cross-sectional view through the flame reactor burner of FIG. 1.

FIG. 3 shows an end view of the reactant inlet end of the flame reactor burner of FIG. 1.

FIG. 4 shows an end view of the discharge end of the flame reactor burner of FIG. 1.

FIG. 5 shows an elevation view of the reactant input pipe 15 of the flame reactor burner.

FIGS. 6 and 7 show cross-sectional views through the input pipe 15 of the flame reactor burner.

DESCRIPTION OF THE PREFERRED EMBODIMENTS

Figure 9:
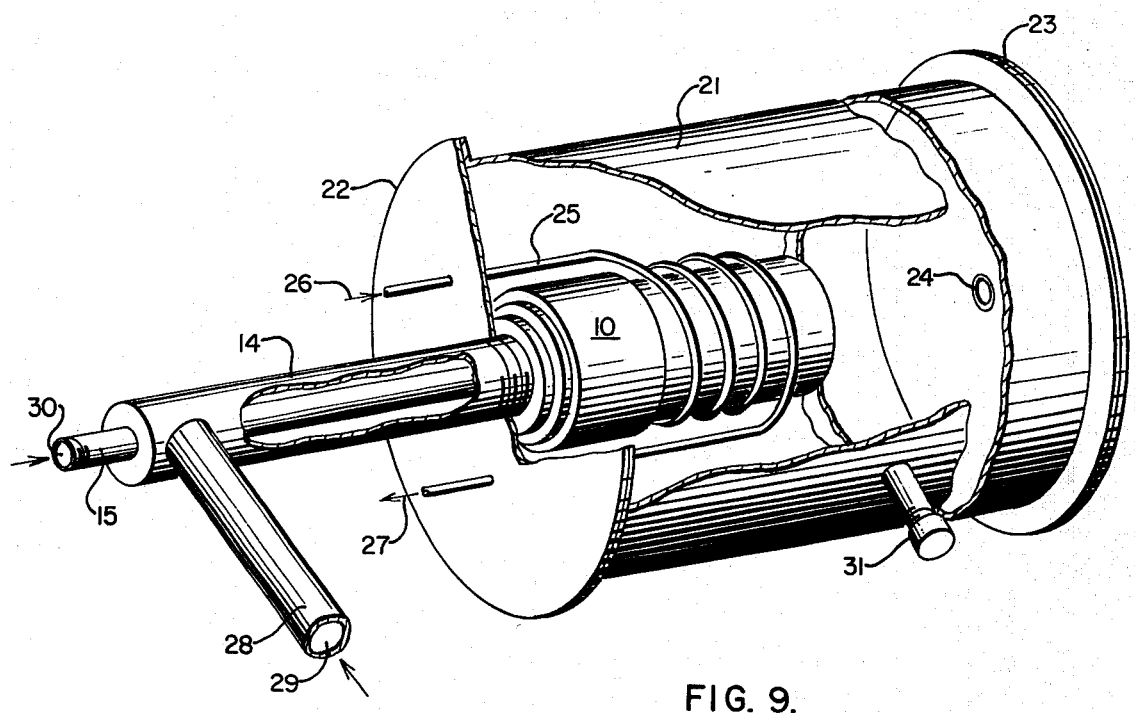
FIG. 9 shows the flame reactor burner of FIG. 1 disposed within an enclosure for maintaining purity of the product.

FIGS. 1 and 2 of the drawing show, respectively, elevation and cross-section views of a flame reactor burner which embodies the features of the present invention. The burner is indicated by reference character 10. The burner has a cylindrical enclosure formed by pipe 11 and pipe coupling 12, the two being threaded together for convenience of assembly and inspection.

Pipe coupling 12 is welded to a reducing adapter 13 which is internally threaded to receive the end of a supply pipe 14. Typically the pipe 11 and coupling 12 are of two inch nominal pipe size and the adapter and supply pipe 14 are of one inch nominal pipe size. A second supply pipe 15 extends through the center of the reactor burner 10. The annular space which is initially between pipes 14 and 15, leads or opens into an annular space within coupling 12 and pipe 11. The supply pipe 15 extends through a portion of the pipe 11, terminating near the mouth or discharge end 16 of the pipe 11. Near its termination, pipe 15 has several slots 17 cut through the walls.

Disposed within the cylindrical enclosure is a helix 18 which preferably is a press fit engagement with pipes 11 and 15 and is located in an intermediate position within pipe 11 near the slots 17. The helix provides a confining helical path through the annular space within pipe 11 to the burner discharge end 16. One of the reactants if fed through the helix 18 in this annular space whereby there is established a helical flow thereof in the cylindrical enclosure. The other reactant flows within pipe 15 and is discharged radially into the first reactant through the slots 17. The slots 17 provide for the radial feed or discharge of one of the reactants into the other reactant in the region of helical flow of the reactant in the annular open space between pipe 11 and 15.

The mixed reactants continue flow within 11 in the helical flow pattern thus established and, due to centrifugal forces resulting from the helical flow, spill out in a helico-spiral pattern after they leave the confines of pipe 11 at the discharge end 16 to form a flame which assumes a more or less hemispherical or mushroom shape. The flame is highly stable and is readily controlled over a wide range of flow rates of the reactants.

Preferably because of its density, bromine in gaseous form is supplied as the first reactant at the annulus between pipes 14 and 15 and is established in a helical flow path within the pipe 11 by the helix 18. Preferably hydrogen is the second reactant which is fed radially into the first reactant within pipe 11 in the region of helical flow of the first reactant. Preferably, the hydrogen is injected into the bromine downstream of the helix as shown in the figures. This is preferred to minimize stratification or "layering" of the reactants within pipe 11. Alternately part or all of the hydrogen is fed to the bromine stream prior to the helix.

Although a helix disposed within cylindrical enclosure of pipe 11 and in contact with pipe 11 and pipe 15 is a preferred arrangement of the means for establishing a helical flow of the first gaseous reactant, various equivalent structures are possible. For example, a helix 18 may be used which is of smaller outer diameter than the inside diameter of pipe 11 and which therefore does not contact the pipe 11 at any point being supported entirely by pipe 15. In another alternate arrangement, the helix may be omitted entirely and replaced by a tangential entry supply pipe for one of the reactants discharging into pipe 11 or coupling 12 preferably near the end thereof which is opposite from the discharge end 16. This arrangement creates a vortex or helical flow of one reactant within the cylindrical enclosure. In other arrangements the pipe 15 per se may terminate at the upstream end 19 of helix 18 and the inner sleeve portion 19-A of helix 18 may serve to convey the reactant from within pipe 15 to the radial discharge slots cut in a downstream extension of helix 18. It is thus evident that numerous physical variations are possible to facilitate construction, assembly, use, inspection and maintenance of the burner. Dimensions of the burner, although important, are not particularly critical. For example, the two inch nominal pipe enclosure size can be changed to larger or smaller sizes and the other dimensions adjusted more or less proportionately. Thus the basic size of the pipe 11 can be of other nominal pipe sizes 1 inch, 1½ inches, 2½ inches, 3 inches, 4 inches, 6 inches: and the like, or of other dimensions ranging typically from about ½ inch to about 12 inches inside diameter of tube 11. Normally, such different sizes would be chosen to provide greater or lesser combustion rates so that simple routine experimentation with each size will reveal optimum ranges of flow rates.

FIG. 3 shows an end view of the feed end of the flame reactor burner 10. This figure indicates preferred relationship of the feed pipes 14 and 15 and shows the annular space therebetween as well as the underside of cap 20 which is welded, threaded or otherwise affixed at the end of pipe 15.

FIG. 4 shows an end view of the discharge end of the flame reactor burner 10. This figure shows pipe 11, coupling 12, helix 18 and cap 20 of supply pipe 15.

FIG. 5 shows an elevation view of a preferred configuration of the supply pipe 15 indicating the end cap 20 and slots 17. Preferably, the slots 17 are in one or more planar configurations which are perpendicular to and along the longitudinal axis of pipe 15. The figures show the slots placed in two rows. Where two rows of two slots each are used, each slot preferably covers an angle of about 90° of the circumference of pipe 15 to provide a substantially uniform dispersion flow of the second reactant into the helically flowing first reactant. In alternate arrangements, different numbers of slots and numbers of rows may be used and the slots may have different circumferential extent along pipe 15 to achieve convenience of manufacture or optimize distribution and contact of the reactants. Generally, the direction of the helical path is not critical. The flow can be either clockwise as shown or counterclockwise.

FIGS. 6 and 7 indicate section views through the slots 17 of FIG. 5 to show a preferred extent and relationship of the slots in pipe 15.

Figure 8:
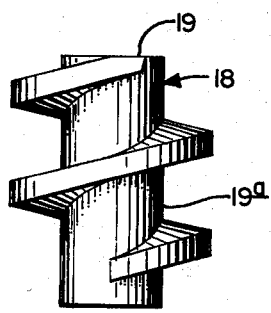
FIG. 8 shows an elevation view of the helix 18 of the flame reactor burner.

FIG. 8 shows an elevational view of helix 18. One reactant flows through the helical path formed between the helix 18 and the outer pipe 11 as shown in FIG. 2 whereby the reactant is established in a helical flow path within the cylindrical enclosure formed by pipe 11.

FIG. 9 is a partially cut-away view of the flame reactor burner 10 in place in an enclosure 21 which provides for collection of the product with controlled exclusion of oxygen, water vapor and other contaminants. Typically, for a 2 inch pipe burner 10, enclosure 21 is a section of 12 inch pipe provided with end covers 22, 23. Reaction product is typically removed through an opening 24 in cover 23. Preferably the enclosure 21 is insulated or jacketed by suitable means omitted in the figure for purpose of clarity to provide desired control over the temperature and pressure therein. Generally speaking, it is preferred to use one flame reactor burner 10 per enclosure 21; however, for increased capacity several burners can be placed side-by-side in a single enclosure 21 all mounted on plate 22. Where such multiple burner installations are used, the burners are preferably located sufficiently far apart so that their flames do not interfere excessively with each other.

Temperature control of the flame reactor burner 10 is facilitated by a cooling coil 25 through which is circulated a heat exchanger fluid such as steam or hot dowtherm supplied through lines 26 and 27 to provide initial warm-up or operating cooling of the flame reactor burner 10. In operation, the cooling coil is supplied with a heat exchanger fluid such as water or cold dowtherm to remove excessive heat from burner 10 and thereby prolong burner life and stabilize operation.

Pipes 14 and 15 are indicated in FIG. 9 together with connecting pipe 28 which feeds the annulus between pipes 14 and 15. Typically, gaseous bromine is fed at end 29 and hydrogen is fed at end 30.

Port 31 is provided in enclosure 21 to permit the insertion of a torch for igniting the combustible mixture released from the flame reactor burner 10. To avoid contamination with water vapor, a torch used to ignite the reactants emitted by burner 10 preferably burns hydrogen with chlorine or bromine, preferably chlorine. After ignition, the port is closed.

One of the principal features of the flame reactor of the present invention is that it provides suitable operation for a comparatively long time without requiring the use of materials that are particularly expensive or unduly difficult to machine.

One of the significant advantages of the flame reactor of the present invention is that it is constructed of materials that are readily available in a variety of sizes and shapes and which can be machined without excessive difficulty. Usually it is preferred to employ nickel, monel metal or stainless steel for the burner assembly 10 of FIG. 1, to use stainless steel, such as 316, for the tubing 25 which is wrapped around the burner assembly and to use ordinary mild or carbon steel for the enclosure 21. Bromine feed lines which are not exposed to excessive heat are preferably made of glass, plastic, or plastic lined metal pipe. "Kynar," which is a well known polyvinylidene fluoride, in the form of piping or coating on a substrate is ordinarily entirely satisfactory for such service.

Maximum temperatures of the burner 10 generally range from about 500° to about 1000° F; however, considerable variation in this respect is possible through controlling the cooling provided by 25, by baffling, etc.

To maintain a gaseous bromine feed, bromine feed temperatures of from about 100° to about 200° F are preferred with temperatures of about 150° F most preferred. Otherwise the temperature of the bromine feed is not critical. The hydrogen temperature is not particularly critical; however, some preheating of the hydrogen is usually desirable to avoid temperatures in the region of the slots 17 which are sufficiently low to produce condensation of the gaseous bromine. Thus, preferred hydrogen temperatures range from about 100° to about 200° F with temperatures of about 100° F being most preferred.

Pressures within the enclosure 21 are not critical with pressures from about 0.1 to about 25 atmospheres being useful. Preferably, the pressure is from about ½ to about 1 atmosphere to minimize the costs of construction as well as the effects of leakage into or out of enclosure 21. Pressures of hydrogen and bromine in the supply system are not critical as long as the gaseous state prevails for the reactants. Normally it is preferred that the pressure of the reactants supplied in the region of the coupling 10 be at least twice the static pressure that exists within the enclosure 21. Such pressure differential, which typically is from about one atmosphere to about 25 atmospheres is desirable to produce vigorous flows within the helix, within the slots 17 and, overall, a vigorous spiral component to the mixed reactants as they leave the discharge end 16 of the burner. On the other hand, one does not use pressures and configurations which produce excessive velocities which sometimes tend to produce a flame-out.

The following example indicates a preferred embodiment of the present invention.

EXAMPLE

A flame reactor burner was constructed in accordance with the teachings of the present invention using a 2 inch pipe coupling 12 and a pipe 11 of monel metal of approximately 2 1/16 inches i.d. and ⅛ inch wall thickness. The length of projection of pipe 11 beyond coupling 12 was 4 3/16 inches. Pipes 14 and 15 were of monel metal and of ¼ inch and 1 inch standard pipe sizes, respectively. Helix 18 was machined from nickel and had an overall length of 2½ inches and an i.d. of the center sleeve of 0.543 inch. The o.d. of the center sleeve of helix 18 was 1.065 inches. The o.d. of the helix was approximately 2.065 inches. The helix was two turns long with a pitch of one thread per inch. The thickness of the metal projection forming the coils of the helix was ¼ inch. Thus the coils of the helix were ¾ inch apart and the cross-section of the space between the coils of the helix was approximately ½ inch × ¾ inch. The helix was pressed into the discharge end of pipe 11 to a position wherein the end 19 of helix 18 was 2 inches from discharge end 16 of pipe 11.

Pipe 15 was made of a 24 inch length of ¼ inch schedule 40 monel pipe. Four circumferential slots 17 were cut at an average of about ½ inch upstream from the end cap 20. The slots 17 were 3/32 inches wide, with 3/32 inches spacing between rows. Each had an are angle of about 90°–92°. The end cap 20 was approximately ¾ inch from the end of the helix 18.

In operation, the burner is ignited using the following procedure which is preferred to minimize danger of explosions and entry of contaminants.

The system of FIG. 9 is flushed with nitrogen for several minutes through either or both of the pipes 14 and 15. A hydrogen-chlorine pilot torch is then lighted and inserted at port 31. The pressure of the gaseous bromine supply system connected at 29 is then raised to about 12 psig and the flow of bromine in burner 10 is started at a rate of about 15 percent of the design flow rate. (The 2 inch size burner described in detail herein has a design flow rate of 200 pounds of bromine per hour.) The hydrogen flow rate is then started at 15 percent of design. The burner usually ingites immediately.

It is preferred to allow the burner to operate for several minutes at the 15 percent rate to warm up the system, following which the flows of bromine and hydrogen are slowly increased coincidentally maintaining a light yellow flame. (A deep orange flame indicates excess bromine while a lavender flame indicates excess hydrogen.) The burner provides stable operation at all rates from the 15 percent rate up to about 120 percent of the design rate.

At design flow rates, the axial flow velocity component of the gaseous bromine within the pipe 11 is 14 feet per second and the tangential flow velocity component is 46 feet per second. The hydrogen flow velocity through slots 17 is 200 feet per second at design flow rates.

The following conditions exist at the design flow rates. The hydrogen flow rate was 510 standard cubic feet per hour. The bromine flow rate was 200 pounds per hour. The flame temperature was 2500° F. The product temperature at the opening 24 was 580° F. The pressure within enclosure 21 was 4.6 psig. The supply pressure of the bromine vapor was 12 psig, a control valve being inserted between the vapor source and pipe 28. The hydrogen was obtained from cylinders at about 1700 psig. This was reduced to about 100 psig, passed through a flow meter orifice and flow control valve and then delivered to tube 15.

The conversion of bromine to hydrogen bromide in mol percent averaged about 99.97 percent. In most instances conversion ranged from 99.96 to 99.99 percent, which is virtually quantitative on bromine. These conversions were obtained with only a small excess of hydrogen, typically 2.6 mol percent.

We claim:

1. In a process for reacting gaseous bromine and gaseous hydrogen to produce hydrogen bromide, the improvement which comprises establishing a helical flow of bromine in a cylindrical enclosure, feeding hydrogen radially outward into the bromine in the region of its helical flow and continuously feeding the resultant helico-spiraling flow of bromine and hydrogen into a flame maintained in the vicinity of the discharge end of said enclosure whereby a hemispherical or mushroom shaped low velocity flame is produced.

2. The process of claim 1 wherein the hydrogen is fed into the bromine in said cylindrical enclosure downstream from the location at which said helical flow of bromine is established.

* * * * *

UNITED STATES PATENT OFFICE
CERTIFICATE OF CORRECTION

PATENT NO. : 3,988,427
DATED : October 26, 1976
INVENTOR(S) : Jossier A. Bossier, III and Robert J. Fanning It is certified that error appears in the above—identified patent and that said Letters Patent are hereby corrected as shown below:

Cover page in item [75] reads "Joseph A. Bossler, III, should read -- Joseph A. Bossier, III. Column 3, line 65, reads "if fed", should read -- is fed --. Column 7, line 18, reads "are angle", should read -- arc angle --; line 34, reads "ingites", should read -- ignites --.

Signed and Sealed this

Fifteenth Day of March 1977

[SEAL]

Attest:

RUTH C. MASON
*Attesting Officer*

C. MARSHALL DANN
*Commissioner of Patents and Trademarks*